United States Patent [19]
Shoda et al.
[11] Patent Number: 4,588,185
[45] Date of Patent: May 13, 1986

[54] TRANSFER DEVICE OF SHEET OBJECT

[75] Inventors: Mikio Shoda, Omi Hachiman; Masahiko Oka; Masami Nishida, both of Hikone, all of Japan

[73] Assignee: Dainippon Screen Mfg. Co., Ltd., Kyoto, Japan

[21] Appl. No.: 564,090

[22] Filed: Dec. 21, 1983

[30] Foreign Application Priority Data

Dec. 30, 1982 [JP] Japan ................................ 57-231236

[51] Int. Cl.[4] ......................... B65H 5/04; B65H 29/44

[52] U.S. Cl. .................................... 271/267; 118/236; 271/84; 414/744 R

[58] Field of Search ............... 271/306, 307, 308, 312, 271/313, 314, 267, 268, 269, 84, 85, 175, 176, 177; 118/52, 54, 236, 500; 414/744 R, 590, 608

[56] References Cited

U.S. PATENT DOCUMENTS

| | | | |
|---|---|---|---|
| 1,558,389 | 10/1925 | Mueller | 118/52 |
| 1,715,611 | 6/1929 | Lumyuk | 271/307 |
| 3,951,271 | 4/1976 | Mette | 414/744 A X |
| 4,370,086 | 1/1983 | Barry | 414/744 R X |
| 4,392,775 | 7/1983 | Ennis et al. | 414/729 |

FOREIGN PATENT DOCUMENTS

| | | | |
|---|---|---|---|
| 2926555 | 1/1981 | Fed. Rep. of Germany | 118/162 |

*Primary Examiner*—Bruce H. Stoner, Jr.
*Assistant Examiner*—Lawrence J. Goffney, Jr.
*Attorney, Agent, or Firm*—Brumbaugh, Graves, Donohue & Raymond

[57] ABSTRACT

A transfer device of a sheet object in which at least one position adjustment piece is fitted in one transfer bar and at least two position adjustment pieces are fitted in another transfer bar, and in which a spacing between the two transfer bars as well as positions of the position adjustment pieces are adjustable.

4 Claims, 14 Drawing Figures (b)
(a)
10
12
13
14
15
17
21
22
23
25
26
27
28
30
31
32
11
A
A'

26
25
27
13
10
26
27
26
13
27
26
28
12
17
14
16
23
21
24
22

10
12
12
14
28
33
30
30
14
33
12
11
11
14
12
33
25
10
12

TRANSFER DEVICE OF SHEET OBJECT

SUMMARY AND BACKGROUND OF THE INVENTION

The present invention relates to a transfer device of a sheet object and more particularly to a transfer device of a sheet object in which a thin or sheet working object, such as a glass mask base plate, is transferred one by one from a carrier way to a rotary type surface treatment device situated at a working position.

Generally in the conventional rotary type surface treatment device, when a surface treatment of a sheet object is performed with the same suctorially stuck to a spinner head and rotated while feeding some chemical to the surface of the sheet object, in order to transfer the sheet object from the carrier way onto the top face of the spinner head, as shown in FIG. 13 and FIG. 14, two edge portions opposed in the sheet object 10 are placed on transfer bars 12 respectively fixed onto a transfer frame 14, and the sheet object 10 is transferred by rotary movemet or parallel displacement of a transfer arm 33 within a horizontal plane (the rotary movement is illustrated in the Figures).

In this case, the transfer frame 14 is so arranged that the transfer bars 12 may be in parallel with conveyer belts 11, the two conveyer belts 11 may be put between the transfer bars, and the sheet object receiving sides of the transfer bars 12 may be in the level lower than either the contact area or the contact edge of the conveyer belts 11.

Under the indicated state, the sheet object 10 carried by the conveyer belts 11 placed thereon passes over the upper side of the transfer bars 12 and comes to butt to positioning pin 30 to be stopped there, and then a photosensor (not illustrated) detects that the sheet object 10 has reached an end point of the carriage way, and the transfer arm 33 is lifted. As the transfer bar 33 is lifted, the transfer frame 14 is also lifted so that the sheet object 10 may be transferred from the conveyer belts 11 to the transfer bars 12. When the sheet object 10 is placed on the transfer bars 12, the transfer arm 33 is rotated up to form a predetermined angle within a horizontal plane. Thereby, the sheet object 10 is transferred to the upper side of the spinner head 25. Then, from the inner space of a spinner cup 28, the spinner head 25 comes up and the sheet object 10 is lifted by the spinner head 25 resulting in separation of the contact between the sheet object 10 and the transfer bars 12.

After the transfer bar 33 is rotated up to form the predetermined angle within the horizontal plane, it is lowered and the transfer frame 14 is returned to a starting point. Finally, the spinner head 25 is lowered, and, while it is suctorially stuck to the sheet object 10 and performing a predetermined rotary movement, the sheet object 10 is fed with a chemical within the inner space of the spinner cut 28, so that the surface of the sheet object 10 is treated.

Under the foregoing prior art it is necessary for the transfer frame 14 to be replaced or changed according to the form, size, etc. of the sheet plate 10.

It is, therefore, an object of the present invention to provide a transfer device of a sheet object easily adaptable to the variation or change in the external form, size, etc. solely by changing position of components of the transfer frame, particularly in such a case as transferring various sheet objects having different forms, sizes, etc. from the carrier way to the rotary type suface treatment device situated at the working position thereof.

Thus, in accordance with the present invention, there is provided a transfer device of a sheet object in which sheet objects carried one by one through a carrier mechanism are placed on two transfer bars on both sides so as to be intermittently transferred from an end point of a carrier way to a working position, wherein at least one position adjustment piece is fitted in one of the transfer bars and at least two position adjustment pieces are fitted in the other transfer bar, and wherein a spacing between the two transfer bars as well as positions of the position adjustment pieces on the transfer bars are adjustable.

Another object of the present invention is to provide a transfer device of sheet object in which the sheet object is supported by, and in contact with, the position adjustment pieces fitted in the transfer bars so that the contact area with the sheet object may be reduced, and in which, particularly by inclining the contact surface of the sheet object situated on the position adjustment pieces to the underside of the sheet objects, such disadvantages as remaining of a trace or flaw caused by the contact, adhesion of soils, etc., on the surface of the sheet object can be minimized.

A further object of the present invention is to provide a transfer device of sheet object in which, particularly considering that the extent of soil on both sides of a glass mask base plate inevitably affects a yield of semiconductor wafer after the exposure, the contact point and contact area are minimized, thereby eventually contributing to improvement of productivity.

Other objects and features of the present invention will become apparent in the course of the following description with the accompanying drawings.

BRIEF DESCRIPTION OF THE DRAWINGS

In the accompanying drawings, forming a part of the present invention, and in which like parts are designated reference numerals or characters throughout the same.

DESCRIPTION OF THE PREFERRED EMBODIMENTS

Figure 1:
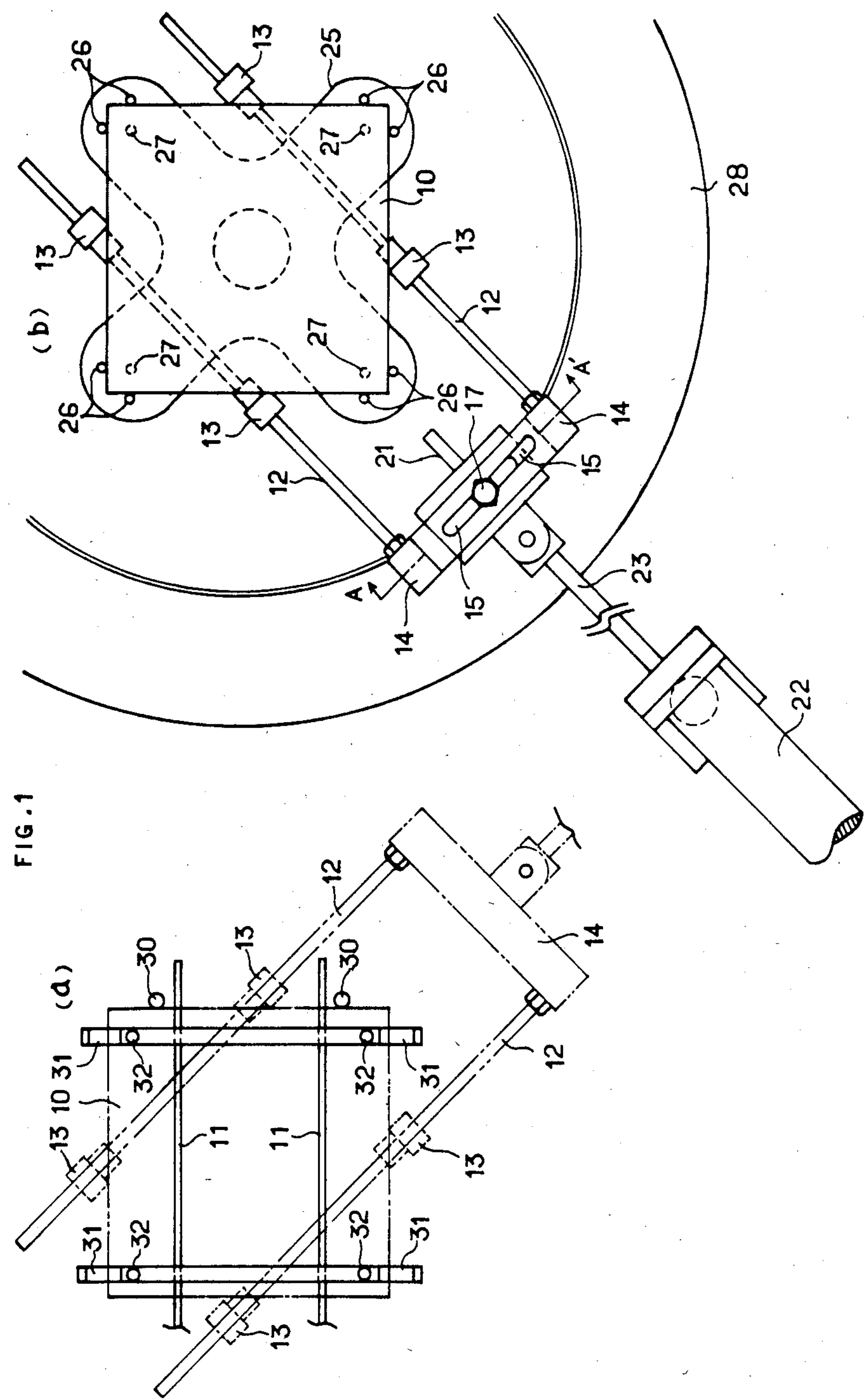
FIG. 1 is a plan view showing two positions, an end point position (a) and a working position (b) of the substantial part of a transfer device of sheet object embodied in accordance with the present invention.
Figure 2:
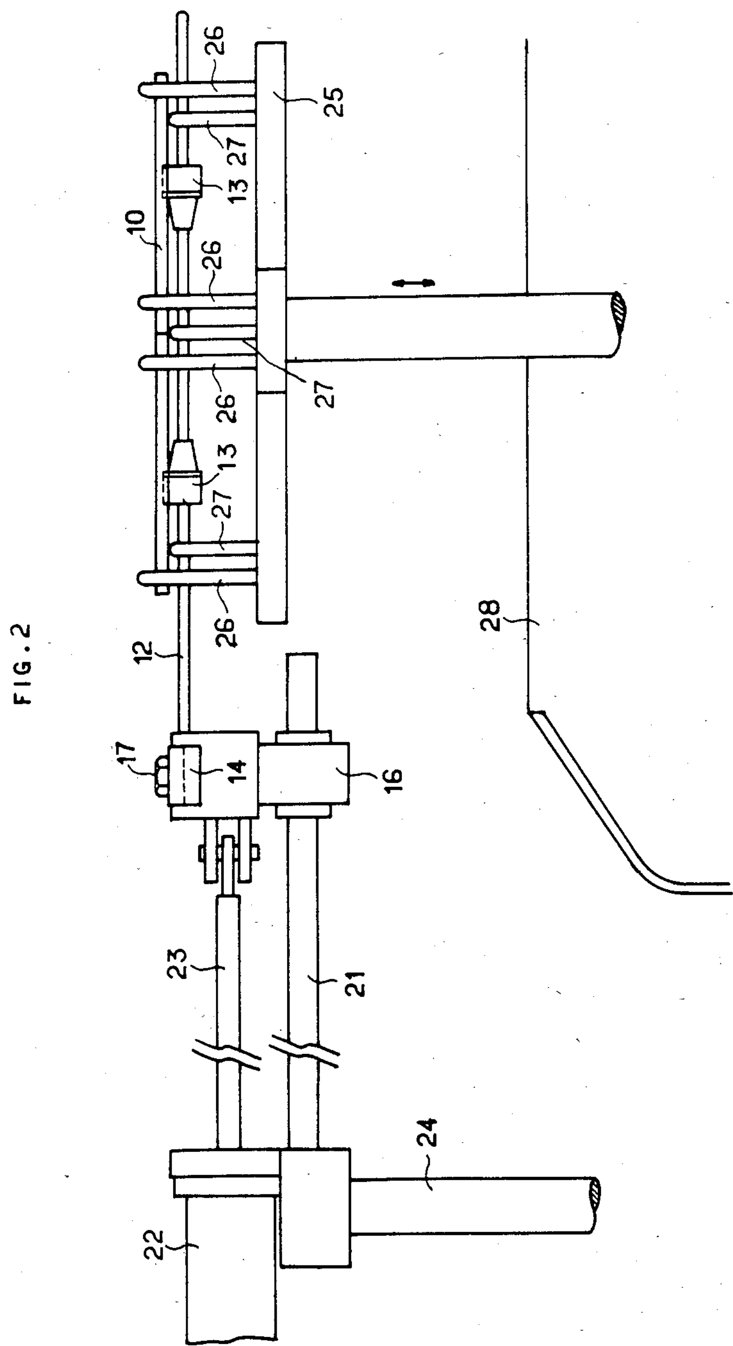
FIG. 2 is a side view of the same transfer device of sheet object.

Referring now in detail to the accompanying drawings, as shown in FIG. 1 and FIG. 2, in transfer device of sheet objects in which a sheet object 10 are carried one by one from a storage point (not illustrated) through a carrier mechanism (or conveyor belts) 11 and placed on two bars 12 on both sides and intermittently transferred from an end point (shown in FIG. 1(*a*)) to a working position (shown in FIG. 1(*b*)). In order to support the sheet object 10 in contact with the transfer device, at least one position adjustment piece 13 is fitted in one of the transfer bars 12 and at least two position adjustment pieces 13 are fitted in the other transfer bar 12 (in the Figures two pieces are fitted on each bar), and both the spacing between the two transfer bars 12 as well as the position of the position adjustment pieces 13 on the transfer bars are adjustable or controllable. In effect, the spacing between the transfer bars 12 and the position of the position adjustment pieces 13 can be adjusted according to form, size, etc. of the sheet object 10 such as rectangle, disk, etc.

Figure 3:
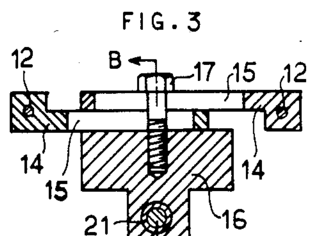
FIG. 3 and FIG. 4 are a sectional view taken in the line A—A' of FIG. 1 and a sectional view taken in the line B—B' of FIG. 3 respectively showing the transfer frame and the peripheral area thereof.
Figure 4:
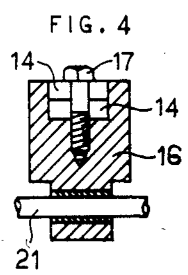
Figure 5:
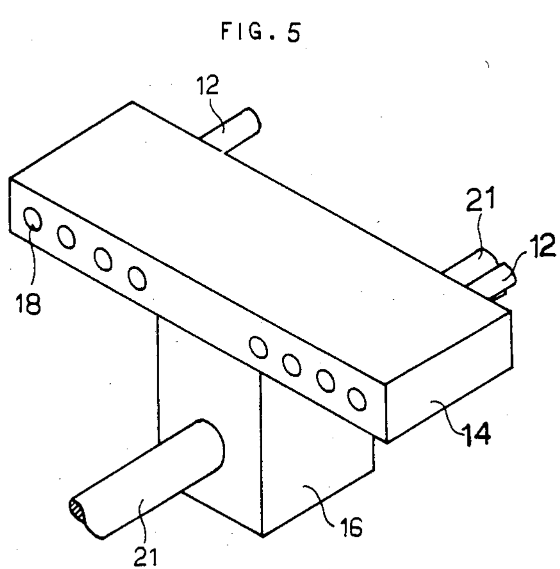
FIG. 5 is a perspective view of another embodiment showing the transfer frame and the peripheral area thereof.

In the embodiment shown in FIG. 1 and FIG. 2, one end of each the two transfer bars 12 is inserted into the transfer frame 14 to be supported therein, and two position adjustment pieces 13 are fitted on each of the transfer bars 12. The sectional form of the transfer bars 12 may be either circular or rectangular. As illustratively shown in FIG. 1(*b*), FIG. 3 and FIG. 4, the spacing between the transfer bars 12 is adjusted by making sliding movement of each of two transfer frame members 14 having a slot 15 in the center thereof and being lapped over each other to be integrally inserted into a recess portion of a block 16, under the state when the underside of a head of a bolt 17 is not pressed in the top face of the transfer frame 14. After the adjustment, the transfer frame 14 is tightly fixed to the block through the bolt 17. In this case the transfer frame 14 must be securely fixed as shown in FIG. 4. Then as shown in FIG. 5, in order to insert the transfer bars 12 into the transfer frame 14, a plurality of through holes 18 are provided in parallel and bilaterally symmetrical positions on the transfer frame 14 permitting the through holes 18 for the insertion of the transfer bars 12 to be optionally selected according to the form or size of the sheet object 10.

Figure 6:
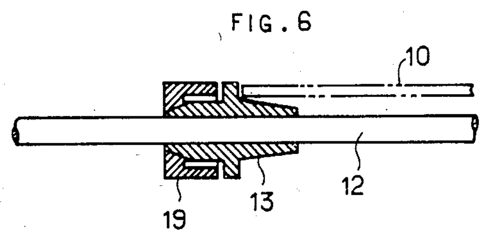
FIG. 6 and FIG. 7 are illustrated for the explanation of a method for fixing the position adjustment piece to the transfer bar.
Figure 7:
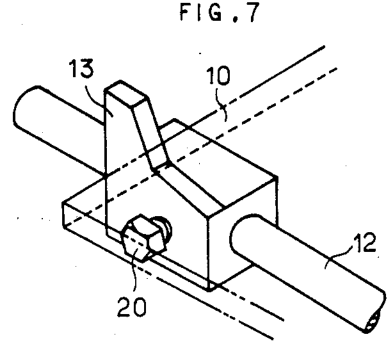

On the other hand, each of the position adjustment pieces 13 is fixed to the transfer bars 12 through a nut 19 as shown in FIG. 6, through a bolt 20 in FIG. 7 or through any other method. When the positions of the position adjustment pieces 13 on the transfer bars 12 are adjusted, said tightening through the nut 19, the bolt 20, etc. is loosened so as to slide the position adjustment pieces 13 on the transfer bars 12. In this case, it is preferred that the contact surface with the sheet object 10 has an inclination to the underside of the sheet object 10 as shown in FIG. 6 and FIG. 7 so that the contact area between the sheet object 10 and the position adjustment pieces 13 may be reduced as much as possible, thereby minimizing such disadvantages as remaining of trace caused by the contact, adhesion of soils, etc. on the surface of the sheet object 10.

Further, a guide bar 21 is provided to pass through the lower part of the block 16 so that the block 16 may be slided along with the guide bar 21. The upper part of the block 16 is mated with a rod 23 of an air cylinder 22 on the side opposite to the projection side of the transfer bars 12, and through actuation of an electromagnetic valve (not illustrated), pressurized air is fed to and discharged from the air cylinder 22 (not illustrated in detail), the rod 23 being put in and out of the air cylinder 22, thereby the block 16 performing reciprocating motion along with the guide bar 21. As the air cylinder 22 is fixed onto a spindle 24, the said spindle 24 can be rotated within a predetermined angle by a motor, a positioning disk and a sensor (not illustrated).

Figure 8:
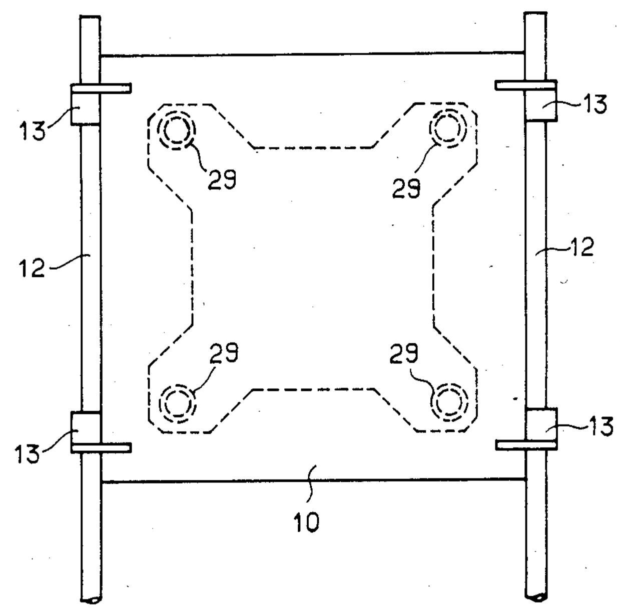
FIG. 8 and FIG. 9 are a plan view and a front view of a further embodiment in which the sheet object is suctorially stuck to and placed by a spinner head.
Figure 9:
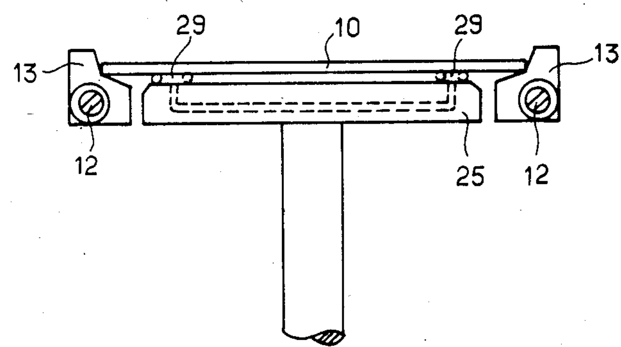

Meanwhile, on a spinner head 25 there are projectingly provided check pins 26 to check oscillation of the sheet object 10 within a horizontal plane, support pins 27 to support and hold the sheet object 10, both in the required number of pieces. The spinner head 25 is so formed as not only to be lifted and lowered but to perform rotary motion within the inner space of a spinner cup 28. The said spinner head 25 is to be changed or replaced according to the form or size of the sheet object 10. In this connection, as shown in FIG. 8 and FIG. 9, the spinner head 25 can be so formed as to fit several O rings 29 for vacuum suction, for example, four such O rings 29 on the upper side thereof, thus the sheet object 10 being suctorially stuck on the O rings 29.

Figure 12:
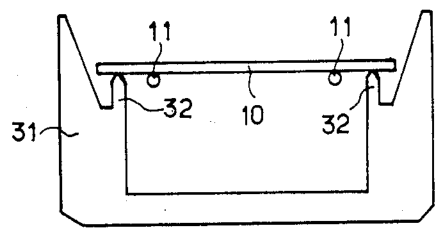
FIG. 12 is a front view of the end point of the carrier way and the peripheral area thereof in the modification.
Figures 13, 14:
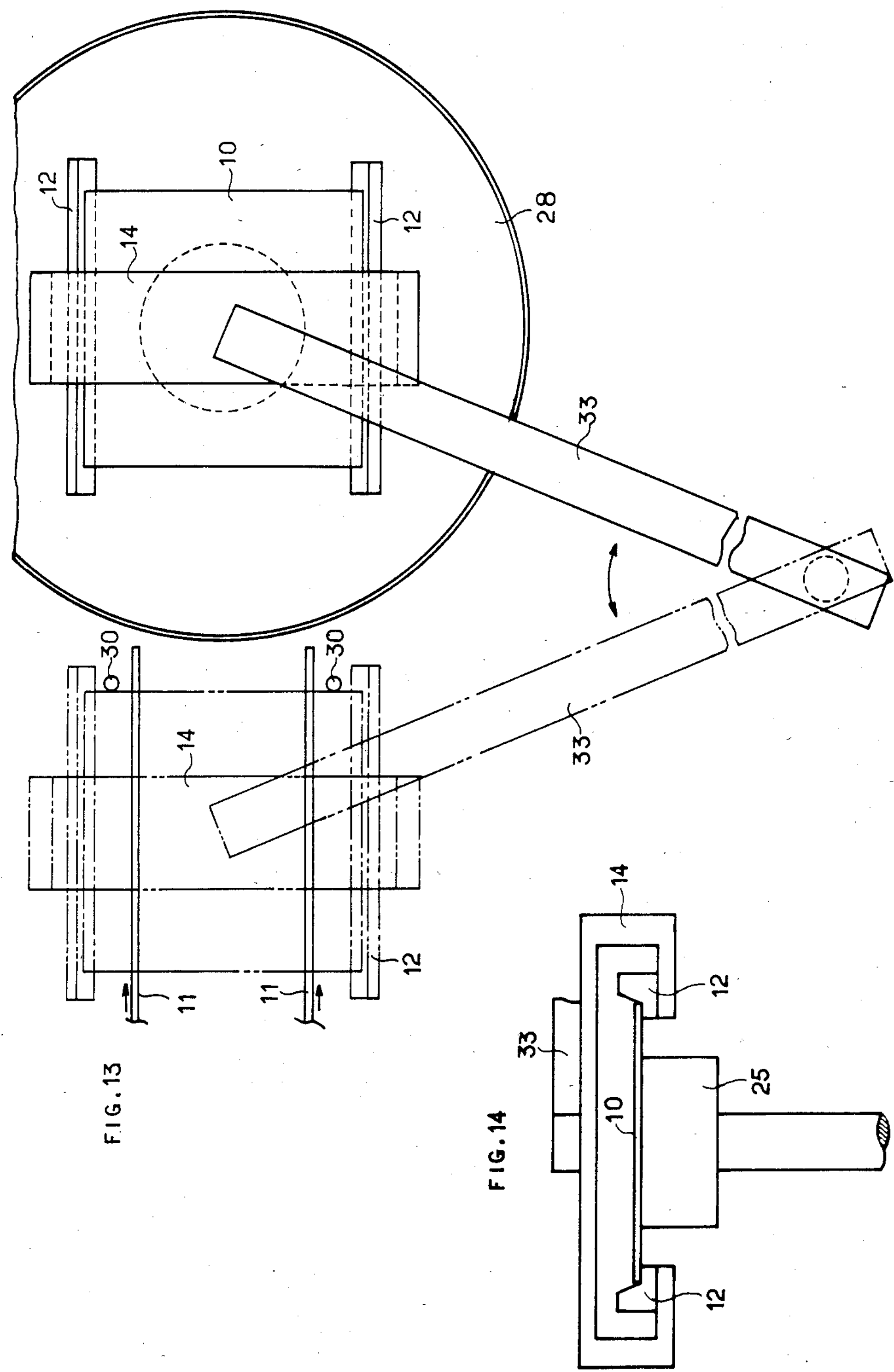
FIG. 13 and FIG. 14 are a plan view and a front view respectively for the explanation of the formation in the conventional transfer device of sheet object.

In FIG. 1(*a*), positioning pins 30 as well as lifters 31 for lifting the sheet object 10 placed on the conveyer belts 11 are shown respectively. As shown in FIG. 12, the lifters 31 also serve as a carrier guide for the sheet object 10, and although contact pins 31 of the lifters 31 are usually situated under the conveyer belts 11, when the sheet object 10, which is carried up to the end point of the carrier way, is placed in the transfer bars 12, the contact pins 32 come up so as to lift the sheet object 10. Consequently, spaces into which transfer bars are inserted are produced between the conveyer belts 11 and the sheet object 10.

Now referring to the actuation of the transfer device of sheet object having the foregoing formation, as shown in FIG. 1 and FIG. 2, in the first place, the spacing between the two transfer bars 12 as well as fitting positions of the position adjustment pieces 13 on the transfer bars 12 are to be determined beforehand according to the form and size of the sheet object 10. Then, as shown in FIG. 1(*a*), the sheet objects 10 are carried one by one from the storage point (not illustrated) along the conveyer belts 11 to a point where an edge of the sheet object 10 in the carrier direction comes to butt to the positioning pins 30, and is stopped there.

A photosensor detects or confirms that the sheet object 10 has reached the end point of the carrier way in the above manner, and, by the detection signal, the lifters 31 come up so as to lift the sheet object 10, thereby producing the spaces between the sheet object 10 and the conveyer belts 11 into which the transfer bars 12 are inserted by the actuation of the air cylinder 22. Then the lifters 31 come down so as to place the sheet object 10 on the transfer bars 12.

In the second place, the spindle 24 is rotated at the predetermined angle within the horizontal plane, thereby the sheet object 10 is transferred from the end point of the carrier way (shown in FIG. 1(*a*)) to the working position on the spinner head 25 (shown in FIG. 2(*b*)). In this connection, a positional relation between FIG. 1(*a*) and FIG. 1(*b*) is illustratively shown rather closer to each other than their actual positions. Then, the spinner head 25 comes up from the inner space of the spinner cup 28 so as to lift the sheet object 10 supported by the position adjustment pieces 13 on the transfer bars 12. In this state, through actuation of the air cylinder 22, the transfer bars 12 are drawn out from under the sheet object 10.

Finally, the spinner head 25 with the sheet object 10 placed thereon comes down and a chemical is fed to the surface of the sheet object within the spinner cup 28, thereby together with the rotary motion of the spinner head 25, the surface treatment is performed.

Figure 10:
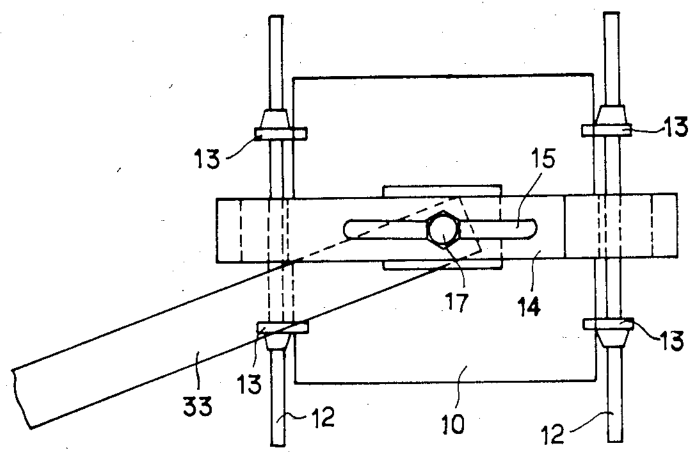
FIG. 10 and FIG. 11 are a plan view and a front view of a modification in accordance with the present invention and showing a state when the sheet object is placed on the transfer bars.
Figure 11:
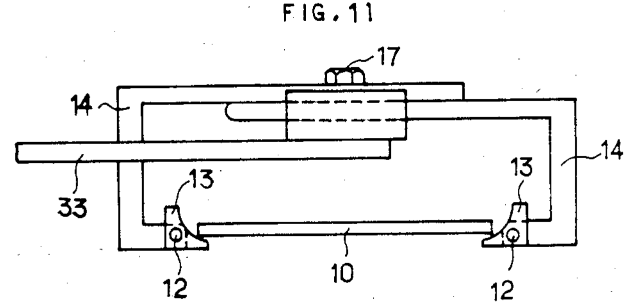

Furthermore, in place of the air cylinder 22 used in the foregoing embodiment, a transfer arm 33 can be provided so as to be lifted and lowered as shown in FIG. 10 and FIG. 11, and in this case, the sheet object 10 may be transferred from the carriage way to the working position thereof in the same actuation as the conventional method.

As the present invention may be embodied in several forms without departing from the spirit of the essential characteristics thereof, the foregoing embodiments are therefore illustrative and not restrictive, since the scope of the invention is defined by the appended claims rather than by the preceding description, and all changes that fall within meets and bounds of the claims, or equivalence of such meets and bounds are therefore intended to be embraced by the claims.

What is claimed is:

1. A device for transferring sheet objects from an end position of a conveyor to a work position of a treatment apparatus, the device comprising:

two parallel transfer bars having a space therebetween;

a plurality of position adjustment pieces for holding the sheet object, including at least one position adjustment piece provided slideably on one of said transfer bars, and at least two position adjustment pieces provided slideably on the other of said transfer bars, each of said adjustment pieces being independently adjustable along said transfer bars;

means for adjusting the space between said transfer bars; and means for intermittently moving said transfer bars and said position adjustment pieces along with the sheet object from the end position to the work position.

2. A device as defined in claim 1, wherein the sheet object has an underside, said position adjustment pieces each being provided with a contact surface inclined so as to engage the underside of the sheet object.

3. A device as defined in claim 1, wherein said adjusting means includes a transfer frame having two overlapping members which are slideable relative to one another, and means for locking the two overlapping members so as to prevent sliding thereof, each of said members being provided with apertures for accepting one of said transfer bars, said sliding of said members providing corresponding adjustment of the space between said transfer bars, said locking means locking said two members together when a desired transfer bar spacing is obtained.

4. A device for transferring sheet objects from an end position of a conveyor to a work position of a treatment apparatus, the device comprising:

two parallel transfer bars having a space therebetween;

a plurality of position adjustment pieces for holding the sheet object, including at least one position adjustment piece provided slideably on one of said transfer bars, and at least two position adjustment pieces provided slideably on the other of said transfer bars, each of said adjustment pieces being independently adjustably along said transfer bars;

means for adjusting the space between said transfer bars including a transfer frame having two overlapping members which are slideable relative to one another, and means for locking together said two members, each of said two members being provided with apertures for supporting one of said transfer bars, the sliding of said members providing corresponding adjustment of the space between said transfer bars, said locking means securely locking said two members together when a desired transfer bar spacing is obtained; and means for intermittently moving said transfer bars and said position adjustment pieces along with the sheet object from the end position to the work position.

* * * * *